United States Patent [19]

Helm

[11] 4,348,147
[45] Sep. 7, 1982

[54] HIGH-LEVEL DUMPING APPARATUS

[75] Inventor: J. Thomas Helm, Franklin, Tenn.

[73] Assignee: Dozier Equipment International Company, Nashville, Tenn.

[21] Appl. No.: 176,855

[22] Filed: Aug. 11, 1980

[51] Int. Cl.³ .............................................. B65G 65/24
[52] U.S. Cl. .................................... 414/420; 414/424; 414/656
[58] Field of Search ............... 414/420, 422, 424, 639, 414/648, 652, 656, 696, 702; 298/11; 105/268

[56] References Cited

U.S. PATENT DOCUMENTS

| | | | |
|---|---|---|---|
| 2,517,787 | 8/1950 | Hanby | 414/648 |
| 2,592,324 | 4/1952 | Oliver | 414/648 X |
| 2,888,157 | 5/1959 | Riley | 414/422 X |
| 3,279,635 | 10/1966 | Avery et al. | 414/420 |

OTHER PUBLICATIONS

Hercules High-Level Dumper, Hercules Industries, Nashville, Tn.

*Primary Examiner*—Leslie J. Paperner
*Attorney, Agent, or Firm*—Harrington A. Lackey

[57] ABSTRACT

A high-level dumping apparatus including an upright frame, a carriage vertically movable on said frame by a linear motor, and a load carrying chute assembly having an upward and rearward projecting tilt arm supported by a laterally shiftable lift member on the carriage for vertically reciprocable and pivotal movement of the chute assembly on the upright frame, and including a trip roller on the top portion of the upright frame in the upward path of the tilt arm to cause the tilt arm to pivot about the trip roller upon engagement of the tilt arm with the trip roller. A pivotal guide element is fixed to the tilt arm to ride in a vertical guide track for directing the vertical movement of the chute assembly and for determining the moment arm of the pivotal thrust exerted upon the chute assembly during its dumping cycle.

8 Claims, 7 Drawing Figures

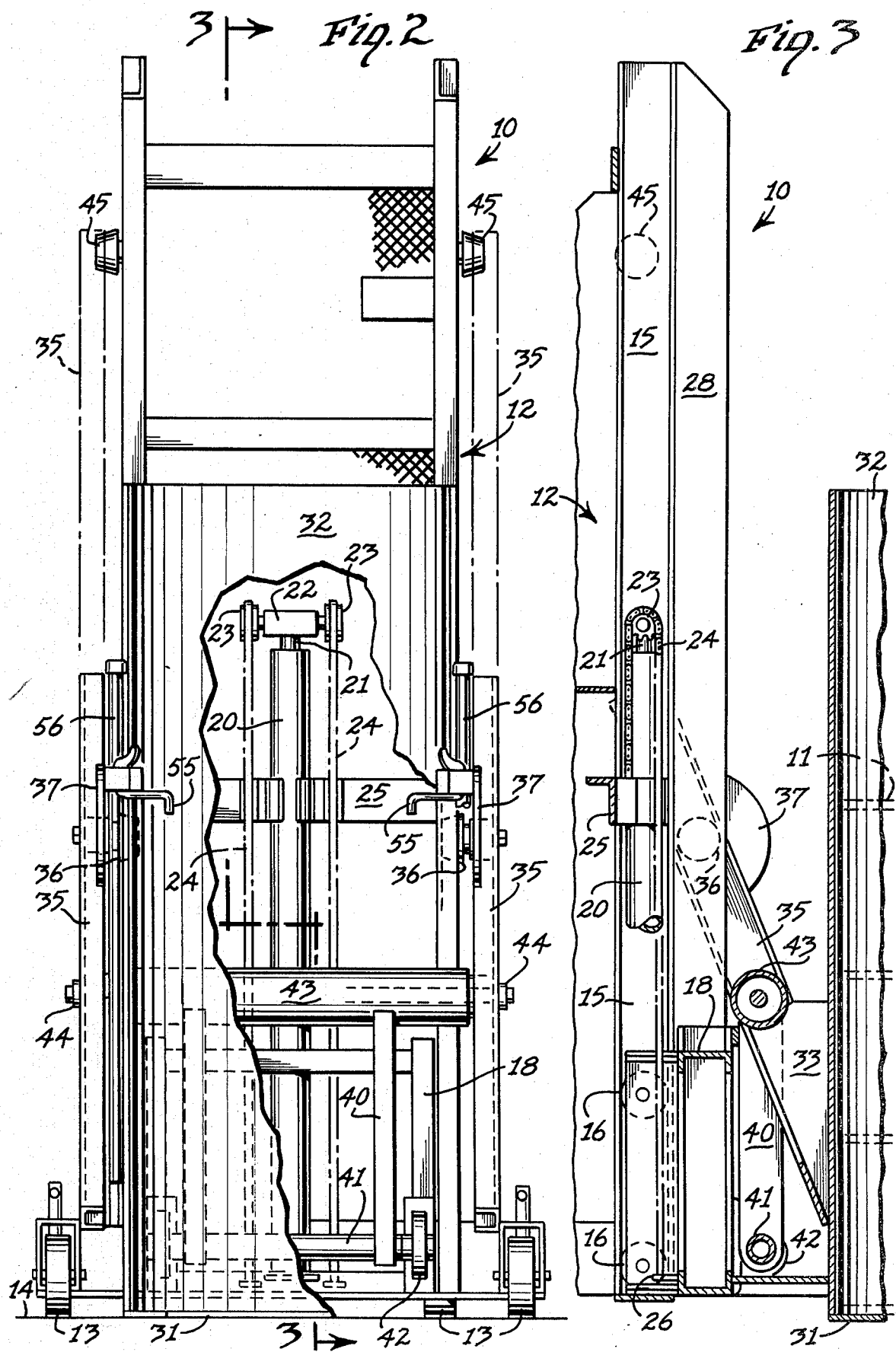

HIGH-LEVEL DUMPING APPARATUS

BACKGROUND OF THE INVENTION

This invention relates to dumping devices, and more particularly to a high-level dumping apparatus.

High-level dumping apparatus or dumpers of various constructions are known in the art.

Some particular high-level dumpers known to the applicant are the Hercules High-Level Dumpers made by Hercules Industries of Nashville, Tenn. One typical Hercules High-Level Dumper Model HI-120 includes an upright standard having a pair of opposed upright parallel carriage tracks supporting the rollers of a vertically movable carriage, reciprocably moved by a power actuator, such as hydraulic ram. A load-carrying chute assembly including a pair of upward and rearwardly inclined tilt arms is pivotally connected to the vertically movable carriage. The upper portion of the upright frame carries a pair of trip or pivot rollers in the upward path of the free ends of the tilt arms. As the chute assembly is moved upward by the power driven carriage, the tilt arms engage the trip rollers to pivot the chute assembly in a vertical overhead arc to dump the load carried by the chute assembly at a high level.

Although the above Hercules High-Level Dumpers are successful devices, nevertheless they have certain limitations.

One limitation is the quantity of the load which can be carried and tilted by each dumper in view of the short lever arms between the trip roller and the pivot point of the chute assembly, for a given power package.

Another limitation is the extensive horizontal travel of the pouring lip of the chute assembly as it swings through the dumping arc, thereby requiring a large target area to receive the poured or dumped contents of the chute assembly.

Because of the extensive horizontal projection of the tilt arms as the chute assembly is pivoted through the dumping arc, an unnecessary amount of clearance is required between each above Hercules dumper and the receptacle for receiving the dumped contents of the chute assembly.

SUMMARY OF THE INVENTION

It is therefore an object of this invention to provide a high-level dumping apparatus which will overcome the above-enumerated disadvantages of the above Hercules High-Level Dumpers, by modifying the location of the pivotal axis of the chute assembly and by providing improved leverage during the dumping cycle.

The high-level dumping apparatus made in accordance with this invention includes substantially the same upright frame, carriage and chute assembly, including the fixed tilt arms as incorporated in the Hercules High-Level Dumper Model HI-120. Moreover, the same trip or pivot rollers are located in the upper portion of the upright frame for engaging and pivoting the tilt arms.

However, instead of fixing the pivotal axis of the chute assembly on the carrier, the pivotal axis is arranged to shift horizontally away from the trip or pivot roller in order to lengthen the lever or moment arm during the dumping cycle, and thereby improve the load capacity of the dumping apparatus. In a preferred arrangement, a lift member is attached to the carriage to exert an upward thrust against the tilt arm or chute assembly at a shiftable, but substantial, distance along the tilt arm from the trip or pivot roller. Thus, the lift member on the carriage is adapted to exert vertical thrust against the chute assembly as the carriage is moved upwardly by its power-driven means. Then, when the tilt arm engages the trip roller causing the tilt arm and chute assembly to pivot or tilt, the upward thrust of the lift member shifts horizontally forward to exert substantial leverage upon the chute assembly about the trip roller.

Furthermore, the above construction of the dumping apparatus made in accordance with this invention permits the discharge point or discharge lip of the chute on the chute assembly to rotate through a smaller discharge arc, with substantially less horizontal coverage, so that the poured contents from the chute assembly will be confined to a smaller target area, thereby making optimum use of the available space for the location and operation of the dumping apparatus.

Moreover, since the tilt arms do not project as far rearward of the frame during any portion of the dumping arc, the receptacle for the dumped contents of the chute assembly may be located substantially closer to the frame of the dumper, than in the above prior art dumpers. Accordingly, floor space for the location of the dumping apparatus and the receptacle may be conserved.

The particular lift member utilized in the high-level dumping apparatus made in accordance with this invention includes a link arm, the lower end of which is pivotally connected to the carrier and the upper end of which is pivotally connected to the chute assembly and/or the tilt arm at a substantial distance from the free end of the tilt arm.

BRIEF DESCRIPTION OF THE DRAWINGS

FIG. 2 is a front elevation of the dumping apparatus disclosed in FIG. 1, with portions broken away;

FIG. 3 is a fragmentary section taken along the line 3—3 of FIG. 2;

DESCRIPTION OF THE PREFERRED EMBODIMENTS

Figure 1:
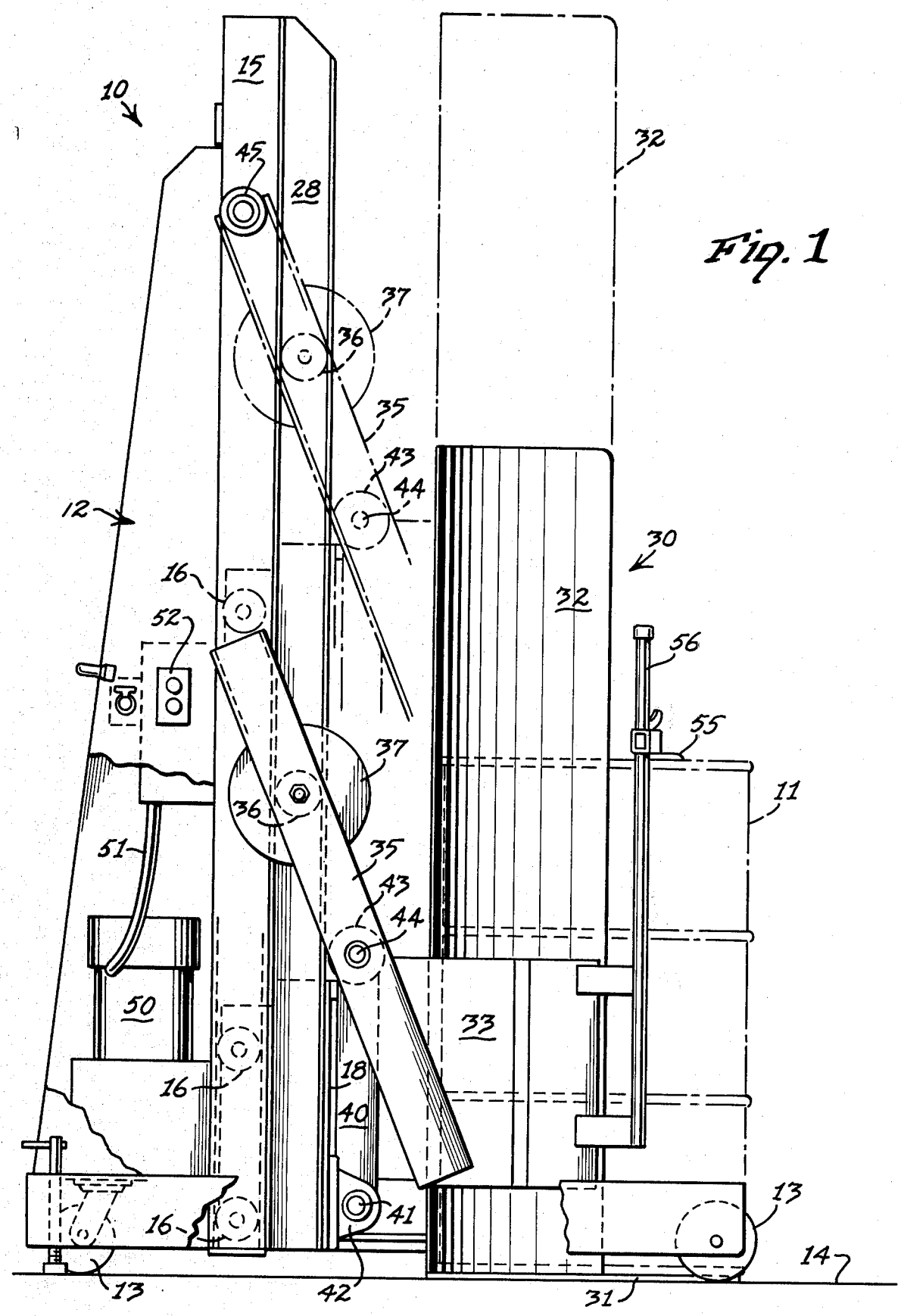
FIG. 1 is a side elevation of a dumping apparatus made in accordance with this invention, with the chute assembly disclosed in solid lines in its lowermost loading position, and disclosed in phantom in an elevated translatory position in which the tilt arm commences engagement with the trip roller.
Figure 4:
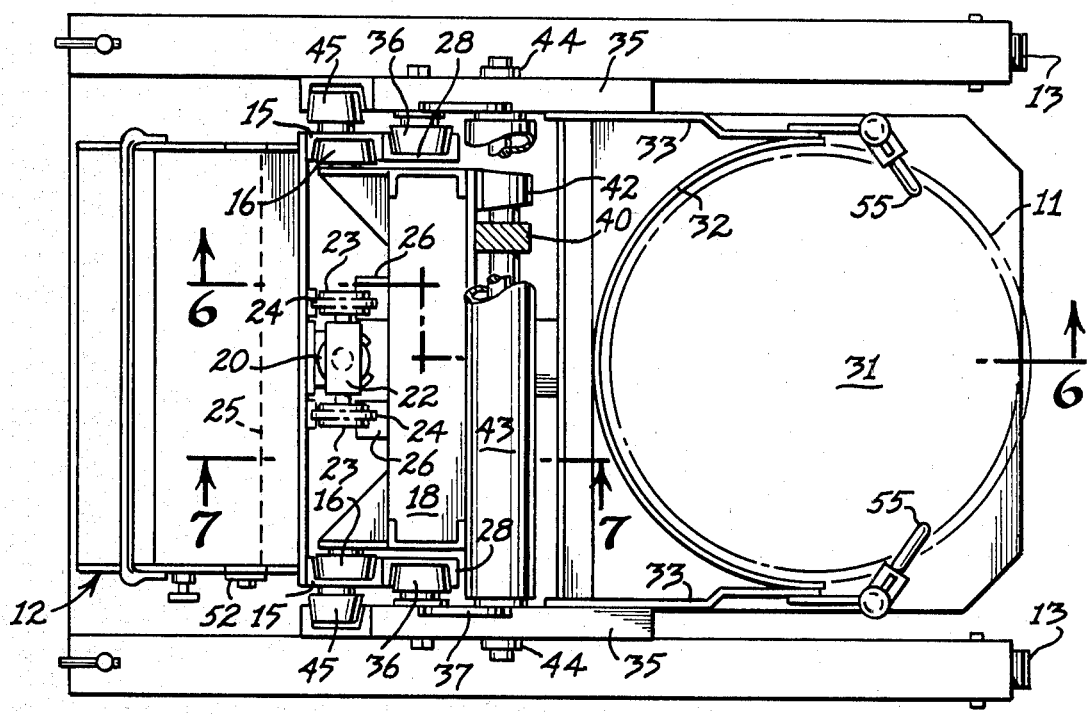
FIG. 4 is a top plan view of the apparatus disclosed in FIG. 1.
Figure 5:
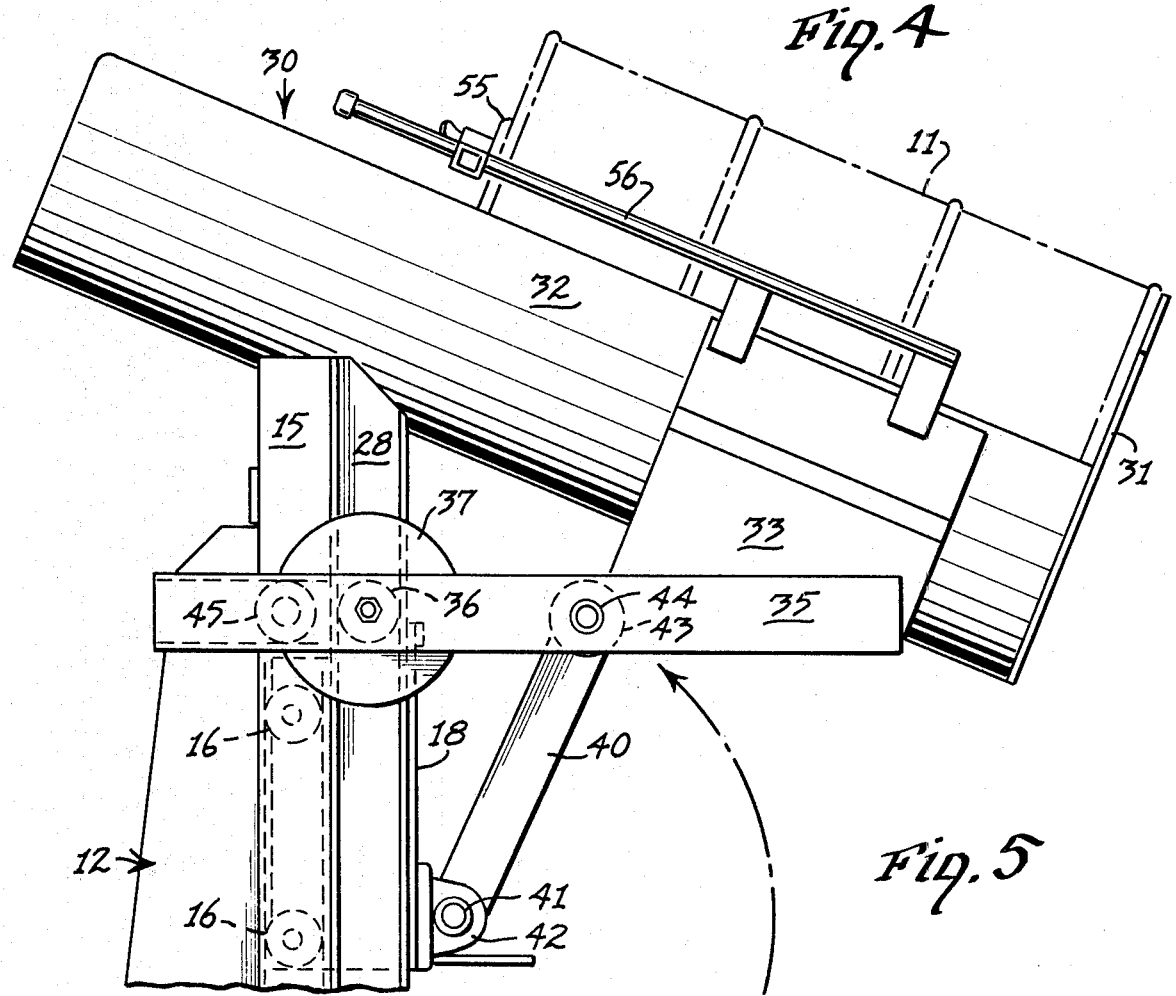
FIG. 5 is a fragmentary side elevation of the upper portion of the upright frame, illustrating the chute assembly in an intermediate tilted position, with the tilt arm horizontal.
Figure 6:
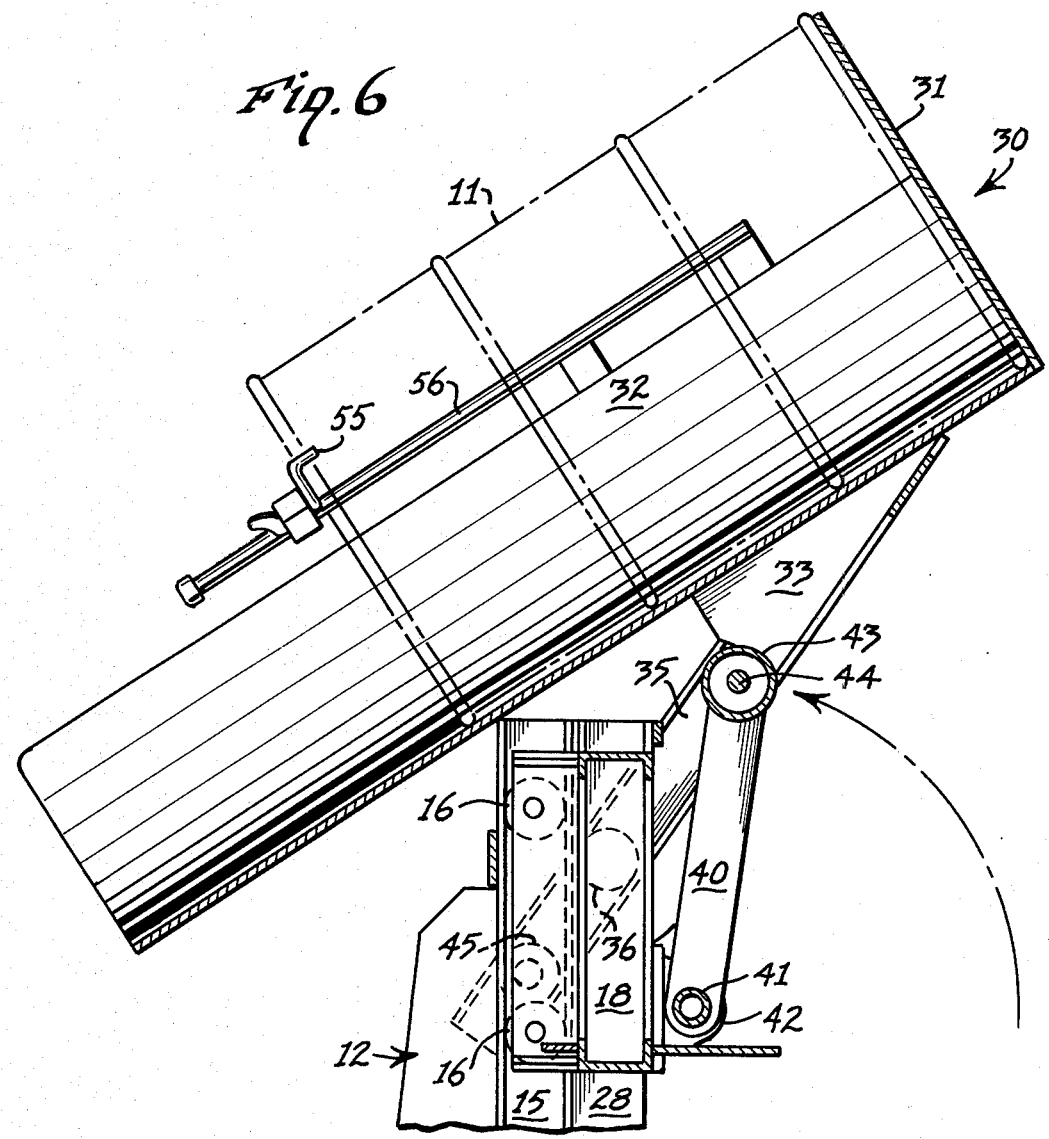
FIG. 6 is a fragmentary sectional elevation of the upper end portion of the upright frame, illustrating the chute assembly in a dumping position, and taken substantially along the line 6—6 of FIG. 4.
Figure 7:
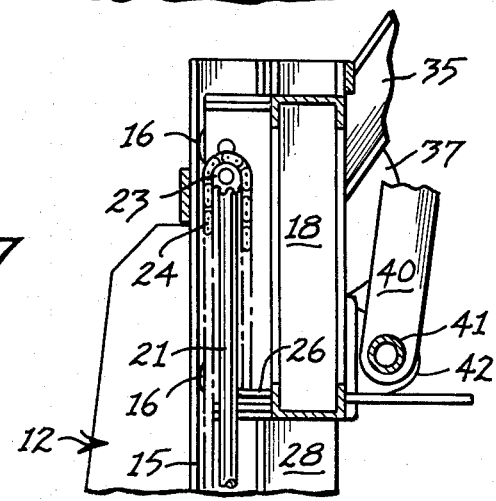
FIG. 7 is another fragmentary sectional elevation of the apparatus in substantially the same position as FIG. 6, but taken along the line 7—7 of FIG. 4.

Referring now to the drawings in more detail, the dumping apparatus 10 made in accordance with this invention is adapted to lift a load, such as a large loaded container or barrel 11, to an elevated position, and then to tilt the barrel to a dumping position, as illustrated in FIGS. 1, 5 and 6.

The apparatus 10 includes an upright frame 12, which may or may not be provided with wheels 13 for support upon a floor 14.

The upright frame 12 includes a pair of elongated vertical carriage tracks 15 illustrated as opposed elongated channel members, adapted to receive carriage rollers 16 mounted on the carriage 18.

The carriage 18 is adapted to be vertically reciprocably moved by a linear fluid motor, such as the hydraulic ram or cylinder 20, having a piston rod 21 terminating in a sprocket head 22 supporting a pair of sprockets 23 carrying chains 24. One end of each chain 24 is fixed to a transverse frame member 25 on the upright frame 12, while the other end of each chain 24 is fixed to flanges 26 on the carriage 18, in order to obtain a 2:1 carriage travel for each length of piston movement.

Forming a part of the frame 12 and fixed parallel to and in front of the carriage tracks 15 are a pair of parallel vertical guide tracks 28, preferably in the form of elongated channel members opening outward.

The chute assembly 30 for carrying and dumping the container 11 includes a platform 31 upon which the barrel or container 11 rests, and a vertically extending arcuate chute 32 fixed between a pair of support plates or frame members 33.

Forming a part of the chute assembly 30 are a pair of tilt arms 35, the lower portions of which are fixed, such as by welding, to the side frame or plate members 33, for extending upward and rearward, and having an upper free end portion. In the preferred form of construction, the tilt arms 35 are made of straight elongated channel bars or members opening inward and opposing each other.

A pair of guide rollers 36 are mounted on the inner surfaces of the tilt arms 35, opposing each other. The axes of the guide rollers 36 are horizontally co-axial and fixed relative to the tilt arms 35. The guide rollers 36 are adapted to rollably engage and travel vertically within the opposed guide tracks 28, while also permitting free pivotal movement of the chute assembly 30, through the tilt arms 35, about the frame 12. A disc-like guard member 37 may be fixed to each tilt arm 35 surrounding each guide roller 37 for protection of the operator.

The chute assembly 30 is connected to the carrier 18 for vertical lifting and dumping, by means of a lift member in the form of a pair of lift or link arms 40, the lower ends of which are fixed to a transverse shaft 41 journaled in the rotary bearings 42 fixed to the lower front faces of the carriage 18. The upper ends of the lift arms 40 are fixed to a transverse member, such as the cylindrical member 43, the ends of which are fixed to rotary bearings 44 journaled in the opposed tilt arms 35 below and in front of the guide rollers 36, in loading position. As illustrated in FIGS. 1 and 3, the lift arms 40 are normally in a substantially vertical position, with the transverse member 43 and the rotary bearings 44 being located in front of and substantially below the guide rollers 36. Thus, during the lifting cycle, as illustrated by the solid-line and dash-line positions of the tilt arms 35 in FIG. 1, the vertical attitude of the lift arms 40 provides maximum utilization of the vertical thrust components transmitted from the carriage 18 to the chute assembly 30 through the lift arms 40.

As illustrated in FIGS. 1 and 2, a pair of trip members, specifically trip or pivot rollers 45, are journaled on the outsides of the upper end portions of the frame member 12, and more specifically upon the exterior surfaces of the carriage roller guide channels 15. As illustrated in FIG. 1, when the tilt arms 35 have been elevated to their phantom-line positions, the upper end portions of each tilt arm 35, having a channel shape, intercepts the respective trip or pivot rollers 45, which then cause the tilt arms 35 to commence tilting about the pivotal axes of the trip rollers 45. However, because the guide rollers 36 fixed to the tilt arms 35 are constrained to ride in the vertical tracks 28, the upper ends of the lift arms 40 are gradually pivoted outward or forward to shift the rotary bearings 44 horizontally farther away from the trip rollers 45 thereby substantially improving the leverage exerted upon the chute assembly 30 by the upwardly moving carriage 18.

Although the vertical thrust vectors exerted upon the bearings 44 gradually move horizontally back toward the frame 12, as the chute 32 swings through its upper dumping quadrant, such as from its position in FIG. 5 to its position in FIG. 6, nevertheless the load contents of the receptacle 11 have commenced discharging, thereby reducing the weight of the loaded chute assembly 30 upon the bearings 44 and the lift arms 40.

Because of the location of the guide rollers 36 relative to the free ends of the tilt arms 35, the upper or rear end portions of the tilt arms 35 will travel less extensively horizontally through their swinging arc than in prior art dumpers. Consequently, the chute 32, as well as its pouring lip, will be constrained to travel through a more limited horizontal reach during its swinging or dumping arc, than the prior art chutes incorporating a tilt arm journaled directly to the carriage and having the same trip roller 45.

After the container 11 is dumped and emptied of its contents in the dumping position of FIG. 6, then the carriage 18 is lowered, causing the chute 32 to swing back through the same arc it traveled in its dumping cycle until the chute 32 is again vertical. Then the chute 32 descends vertically, along with the carriage 18, to its original loading position disclosed in solid-lines in FIG. 1.

The hydraulic cylinder 20 may be supplied with hydraulic fluid from the electrically motor-driven hydraulic pump 50, connected by the electric cable 51 to the manually operated controls 52 on the frame 12.

The chute assembly 30 may also be provided with conventional hold-down clamps 55 vertically adjustable upon the rods 56 fixed to the chute frame members 33.

With the leverage provided by the double-roller construction of the tilt arm 35 and the pivotal lift arms 40, heavier loads can be carried in the chute assembly 30 for a given power package, or the same load can be handled with a smaller power package, than in the previously described prior art Hercules High-Level Dumpers, typified by the Model HI-120.

Also by virtue of the construction of the dumper apparatus 10, the horizontal reach of the chute trajectory during the dumping cycle is considerably reduced, thereby conserving space. By the same token, chutes of greater horizontal trajectory can be designed in an apparatus 10 because of this minimization of the horizontal reach and the reduction of the required target area for receiving the dumped material.

Moreover, because of the double-roller construction and the laterally shifting thrust bearing 44 of the apparatus 10, the angular velocity of the dumping cycle is more uniform, and therefore the dumping rate is more uniform.

What is claimed is:

1. A high-level dumping apparatus comprising:

(a) an upright frame having a front and back and upper and lower frame portions,
(b) an upright carriage track extending between said upper and lower frame portions,
(c) a guide track extending between said upper and lower frame portions in front of said carriage track,
(d) a carriage mounted for reciprocable movement along said carriage track,
(e) means for reciprocably moving said carriage,
(f) load carrying chute means, including a tilt arm having an upper free end portion,
(g) a guide element fixed to said tilt arm for cooperative engagement with said guide track to permit reciprocable movement of said tilt arm along said guide track and pivotal movement of said tilt arm relative to said upright frame,
(h) a trip member fixed to said upper frame portion in the upward path of movement of the upper free end portion of said tilt arm, so that engagement of said trip member by said upward moving tilt arm causes said chute means to pivot upward about the pivotal axis of said trip member, and
(i) a lift member on said carriage cooperative with said chute means for moving said chute means upward with said carriage and for exerting an upward thrust upon said chute means at a predetermined distance along said tilt arm from said guide element.

2. The invention according to claim 1 further comprising a thrust element on said chute means at a predetermined distance along said tilt arm from said guide element and on the opposite side of said guide element from said trip member, said thrust element being cooperative with said lift member to receive upward thrust from said upward moving carriage.

3. The invention according to claim 2 in which substantially the entire thrust force of said lift member is exerted vertically upward against said thrust element during the upward, non-pivotal movement of said chute means.

4. The invention according to claim 3 further comprising means pivotally connected said lift member and said thrust element.

5. The invention according to claim 4 in which said lift member comprises a lift arm having upper and lower end portions, means pivotally connecting the lower end portion of said lift arm to said carriage, and means pivotally connecting the upper end portion of said lift arm to said thrust element.

6. The invention according to claim 5 in which said lift arm is in front of said guide track.

7. The invention according to claim 1 in which said guide element is a guide roller having its rotary axis fixed relative to said tilt arm and adapted to rollably engage said guide track during the relative movement between said tilt arm and said upright frame.

8. The invention according to claim 1 in which said trip member is a trip roller having its roller axis fixed relativve to said upright frame, said tilt arm having tilt track means rollably engagable with said trip roller.

* * * * *